United States Patent
Seok (10) Patent No.: US 7,559,869 B2
(45) Date of Patent: Jul. 14, 2009

(54) LIMITED SLIP DIFFERENTIAL WITH FRICTION USING A PRESSURE GENERATING DEVICE

(75) Inventor: Chang Sung Seok, Gyeonggi (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 351 days.

(21) Appl. No.: 10/588,550

(22) PCT Filed: Feb. 7, 2005

(86) PCT No.: PCT/KR2005/000381

§ 371 (c)(1),
(2), (4) Date: Aug. 7, 2006

(87) PCT Pub. No.: WO2005/078316

PCT Pub. Date: Aug. 25, 2005

(65) Prior Publication Data

US 2007/0161452 A1    Jul. 12, 2007

(30) Foreign Application Priority Data

Feb. 11, 2004    (KR)    ............... 10-2004-0009053

(51) Int. Cl.
*F16H 48/20* (2006.01)
(52) U.S. Cl. .................. 475/235; 475/232; 475/233; 475/234

(58) Field of Classification Search .............. 475/230, 475/231, 232, 233, 234, 248, 249, 235
See application file for complete search history.

(56) References Cited

U.S. PATENT DOCUMENTS

| 4,838,118 | A | * | 6/1989 | Binkley ................ 475/86 |
| 5,507,702 | A | | 4/1996 | Joachim et al. |
| 5,910,064 | A | * | 6/1999 | Kuroki ................ 475/199 |
| 5,938,556 | A | | 8/1999 | Lowell |
| 6,183,387 | B1 | | 2/2001 | Yoshioka |
| 6,402,656 | B1 | | 6/2002 | Peralta |
| 2003/0121750 | A1 | * | 7/2003 | Teraoka ............ 192/93 A |
| 2004/0162179 | A1 | | 8/2004 | Krzesicki et al. |

* cited by examiner

*Primary Examiner*—David D. Le
(74) *Attorney, Agent, or Firm*—Roberts Mlotkowski Safran & Cole, P.C.; Thomas W. Cole (57) ABSTRACT

The present invention relates to a limited slip differential with friction using a pressure generating device. The limited slip differential includes a first side pinion gear and a second side pinion gear opposite to each other, a pair of differential pinion gears each of which is rotated in engagement with the first and second side pinion gears friction plates arranged at rear sides of the first and second side pinion gears friction plates arranged at rear sides of the first and second side pinion gears, and a pressure generating device having a cover gear and a piston gear and being constructed such that the cover gear and the piston gear engage with the second side pinion gear and first side pinion gear, respectively, and can be displaced away from each other in a longitudinal direction of the device.

4 Claims, 8 Drawing Sheets

FIG.1

PRIOR ART

FIG.2

PRIOR ART

LIMITED SLIP DIFFERENTIAL WITH FRICTION USING A PRESSURE GENERATING DEVICE

TECHNICAL FIELD

Pressure generating device, and more particularly, a limited slip differential with friction using a pressure generating device for performing a slip differential function of a vehicle and simultaneously, by limiting a portion of the slip differential function for movement of the vehicle when a big slip differential occurs, for rotating both wheels smoothly.

BACKGROUND ART

Generally, the limited slip differentials that have been developed until now use a mechanical lock method, an automatic breaker friction clutch method, a torque sensitive friction clutch method, a viscous coupling method, an active control friction clutch method, a Torsen method, etc. depending upon the operating method. Such conventional limited slip differentials were developed variously according to their operating methods. However, the actual circumstance is that the conventional devices have a drawback as the conventional devices had a large volume and the structure of the vehicle must be altered in order to accommodate installation space.

Figure 1:
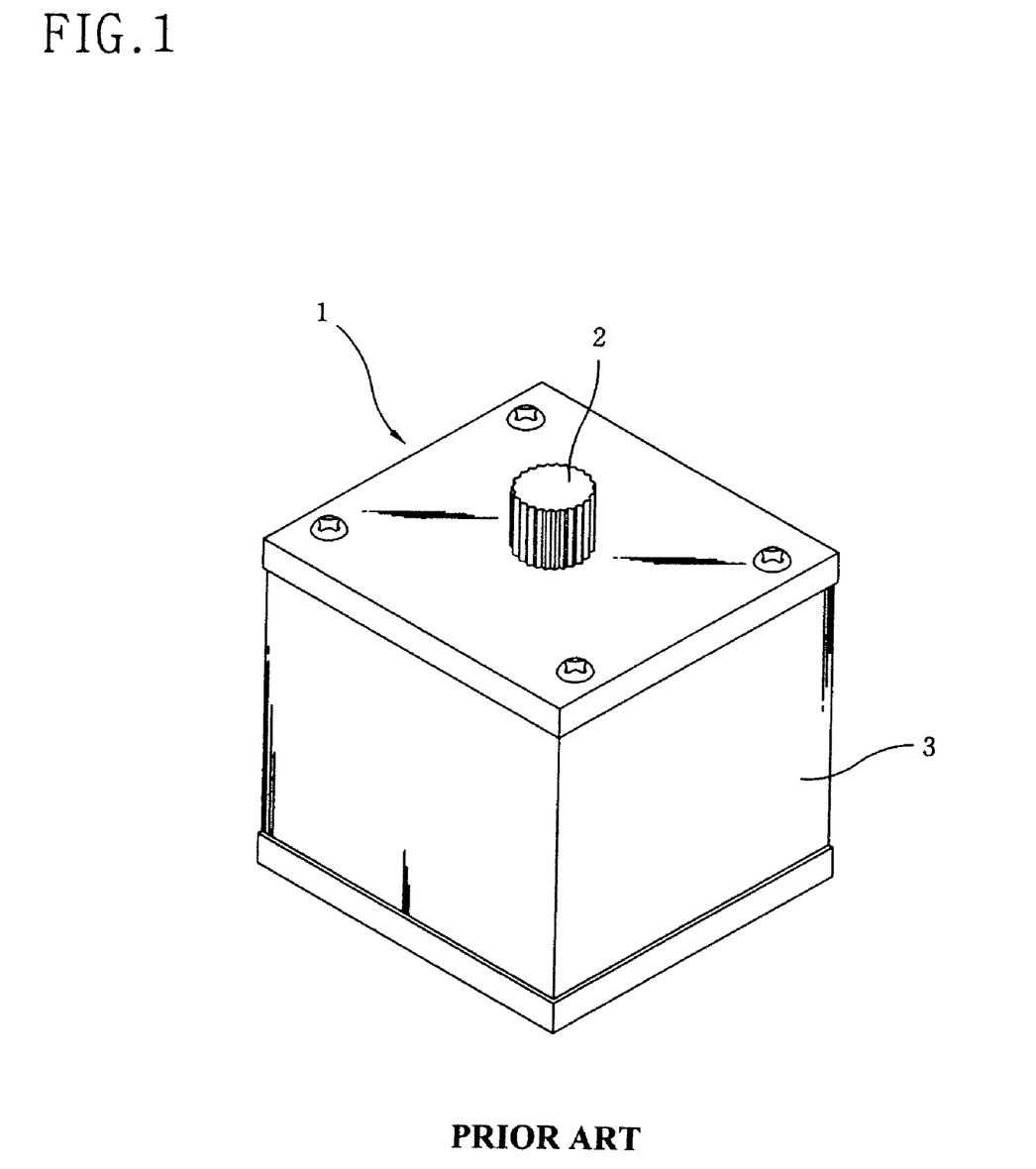
FIG. 1 is a perspective view of a prior art limited slip differential.
Figure 2:
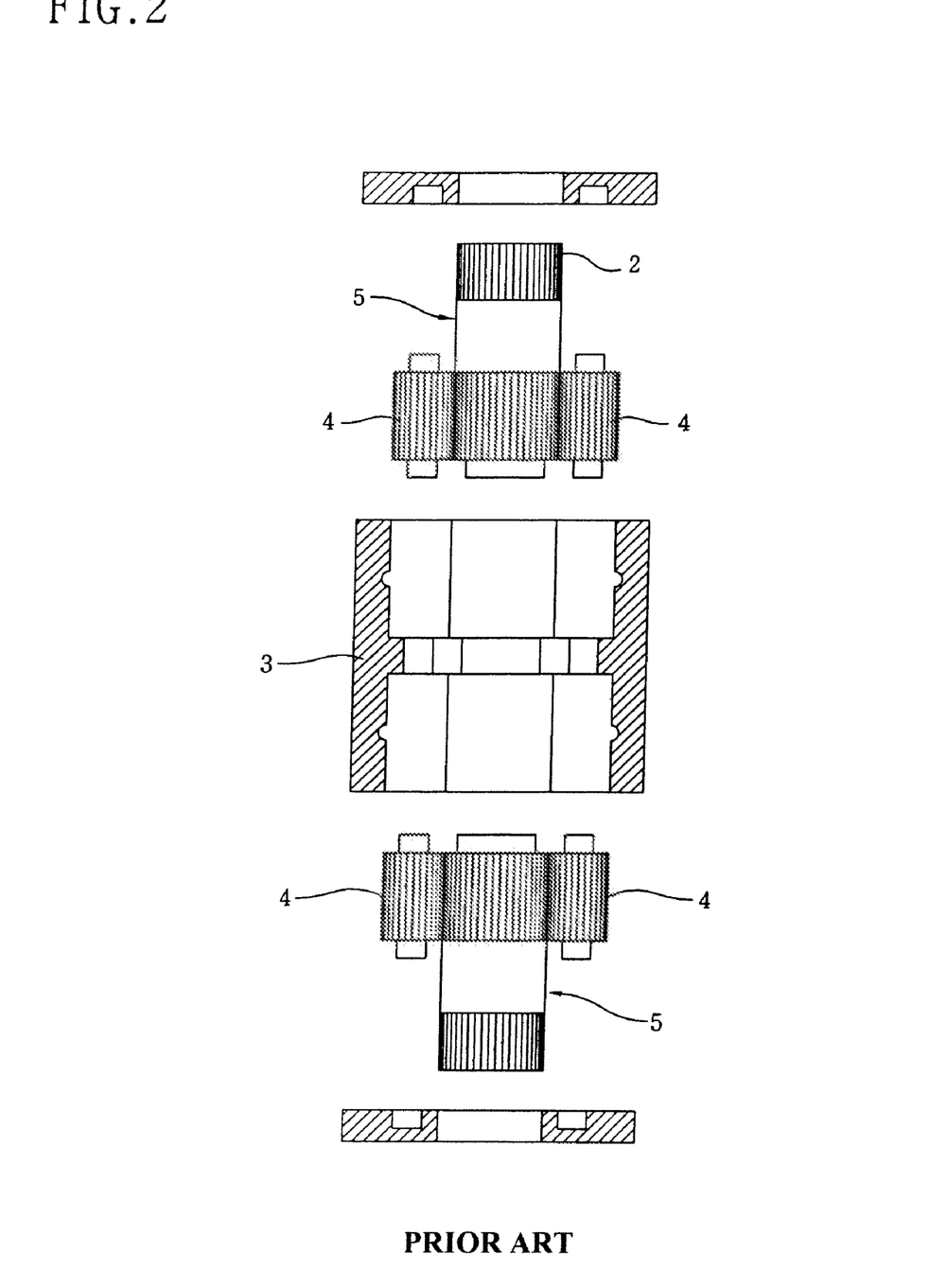
FIG. 2 is an exploded, cross sectional side view of the limited slip differential illustrated in FIG. 1.

FIGS. 1 and 2 are drawings showing the conventional limited slip differential.

In order to compensate for such drawback, recently, the applicant of the present application, as illustrated in FIGS. 1 and 2, has developed a small-sized limited slip differential to be inserted into the differential device of the small-sized car for limiting slip differential.

Referring to FIGS. 1 and 2, the small-sized limited slip differential comprises a case (3), a shaft gear (5) having a gear inserted in the identical upper and lower form of the case (3), a gear (4) installed on the right and left of said shaft gear (5) and rotating with a gear engagement, and a cover (6) engaging up and down after other remaining parts are assembled.

The inside of the case (3) assembled as above is filled with oil having high viscosity, wherein it is constituted to limit the rotation of the differential pinion by pressure change of the oil.

However, as such small-sized limited slip differential constituted as above must be mounted inside of the slip differential device, its size is small, whereby there is a drawback of not being able to generate a high differential limiting ability.

DETAILED DESCRIPTION OF THE PREFERRED EMBODIMENTS

In order to achieve the object of the present invention, a limited slip differential with friction using a pressure generating device comprises a body section (12) having a fixed cover (11), a first side pinion gear (14) arranged inside of said body section (12) and connected with a driving shaft of a vehicle, a second side pinion gear (13) rotatably connected with a driving shaft of vehicle opposite to said first side pinion gear (14), a pair of differential pinion gears (15, 16) each of which is rotated in engagement with said first side pinion gear (14) and second side pinion gear (13), friction plates arranged at rear sides of said first side pinion gear (14) and second side pinion gear (13), and a pressure generating device (20) constructed such that its cover gear (22) and piston gear (25) engage with said second side pinion gear (13) and first side pinion gear (14), respectively, and can be displaced away from each other in a longitudinal direction of said device.

According to such limited slip differential, an effect can be obtained wherein if friction on both wheels is different from the mud, sand pit or iced ground and thus when a situation comes for only one wheel which does not have any friction rotates and the vehicle body is unable to move, the function limiting slip differential is activated, the wheel with much more friction is moved, and thus the vehicle body can be moved.

Also, at the circumstance in which a friction plate is formed between the sides of the differential pinion gears, the present invention is constituted that a pressure generating device is formed therebetween.

As bigger adherence ability is generated by such pressure generating device, an effect is provided wherein a large force is granted such that gears are to be engaged in order not to be vainly rotated to each other.

The pressure generating device of the present invention comprises a body cylinder secured to and rotated together with a cover gear (22) as a unit, and the lower part of said body cylinder is positioned to come in contact with the piston gear, a trocoid gear pump arranged inside of said body cylinder and generating pressure while rotating along with said piston gear, and discharging channels delivering said pressure generated by the rotation of said trocoid gear pump to said piston gear.

Owing to the rotation of the trocoid gear, the inside pressure is further elevated and the force pushing the cover gear and the piston gear in the opposite direction to each other becomes large. Accordingly, an effect is provided wherein the pushing ability is further granted.

In said cover gear (22), the present invention provides a flow passage (17) leading to the inside of said body cylinder (24), and a bellow (21) formed wherein the amount of oil is adjusted through said flow passage (17) when pressure is generated inside of said body cylinder (24).

Through said bellow (21), the oil is delivered to the inside of the body cylinder (24), and thus an effect is provided wherein the pushing pressure is further elevated.

The slip differential having the limited differential function of the above present invention is described as below:

A first side pinion gear (14) is formed inside of the body section (12) and connected with a driving shaft of a vehicle, and a second side pinion gear (13) is formed rotatably connected with a driving shaft of the vehicle located opposite to the first side pinion gear (14).

A pair of differential pinion gears (15, 16) is formed, each of which is rotated in engagement with the first side pinion gear (14) and second side pinion gear (13). Friction plates are arranged at rear sides of the first side pinion gear (14) and second side pinion gear (13) in order to have friction between each other.

A pressure generating device (20) is formed such that in order to be engaged with first side pinion gear (14) and the second side pinion gear (13), the cover gear (22) and the piston gear (25) and can push to both ends in a longitudinal direction of the device.

Also, as another example, identical to the above constitution, the position of the pressure generating device (20) is formed in order to be engaged with the differential pinion gears (15, 16).

The constitution of the pressure generating device (20) comprises a body cylinder (24) secured to and rotated together with a cover gear (22) as a unit. The lower part of the body cylinder (24) is positioned to incorporate a piston gear (25).

A trocoid gear pump (23) is formed inside of the body cylinder (24) and generating pressure while rotating along with the piston gear (25).

At least two discharging channels (45) are formed for delivering the pressure generated by the rotation of the trocoid gear pump (23) to the piston gear (25).

Further, a bellow (21) is formed at the upper side of the cover gear (22) for maintaining the pressure within the space by freely moving up and down at the oil supply and recovery generated when the piston gear (25) performs a vertical movement.

A slip differential having the limited slip differential function of the present invention constituted as above can be described more specifically as shown below.

Figure 3:
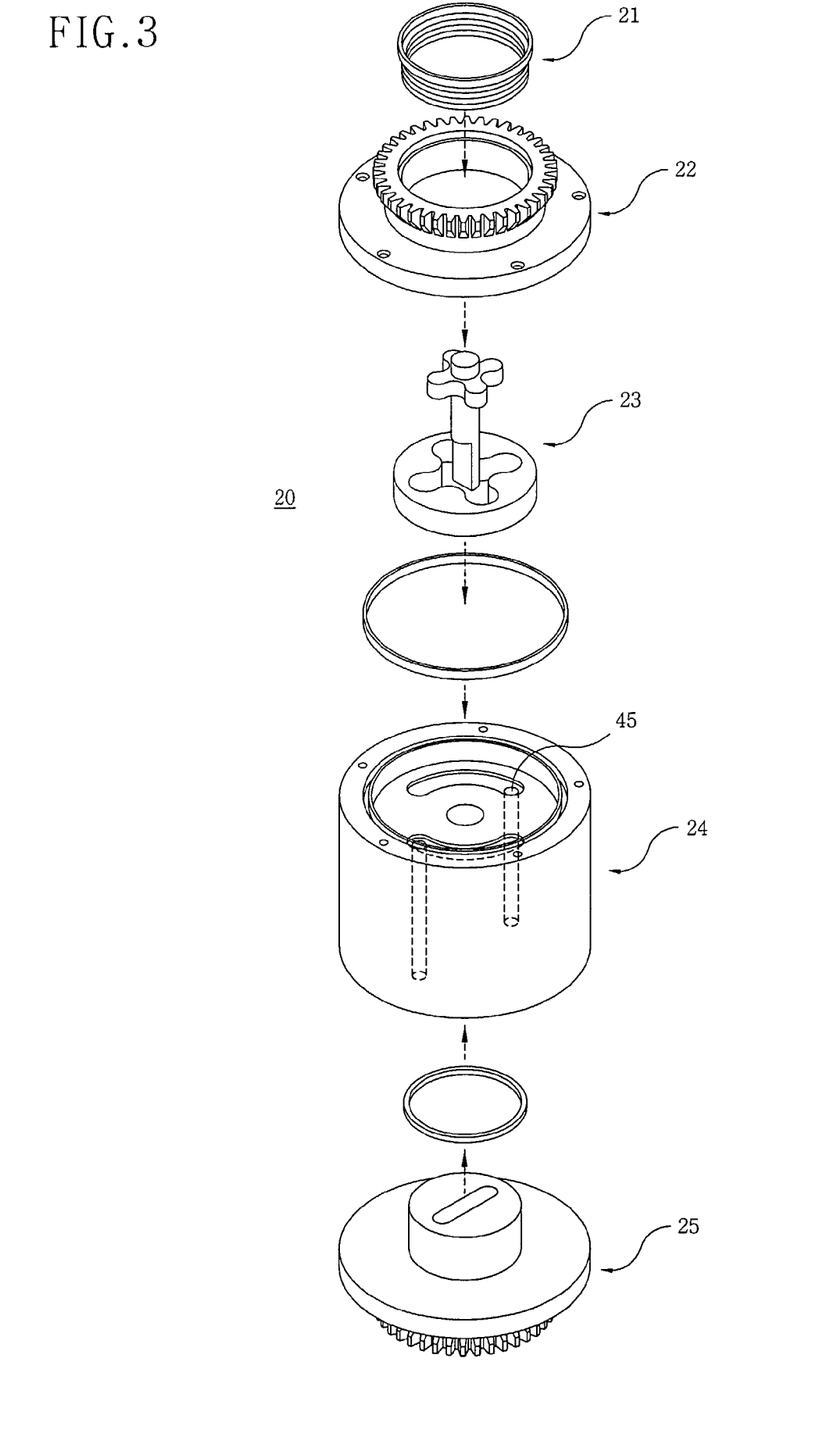
FIG. 3 is a drawing showing the separated state of the pressure generating device of the limited slip differential of the present invention.
Figure 4:
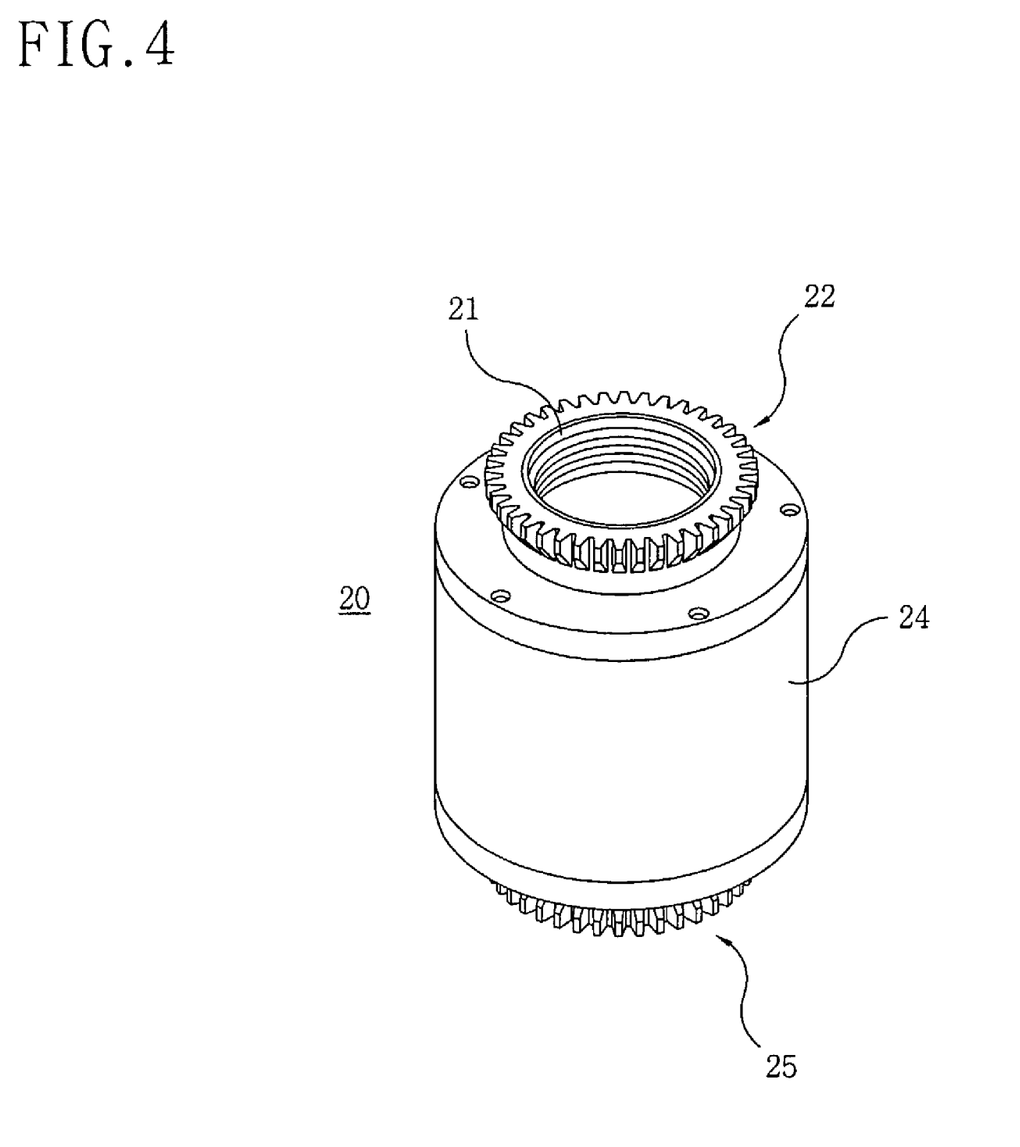
FIG. 4 is a drawing showing the assembled state of the pressure generating device of the limited slip differential of the present invention.
Figure 5:
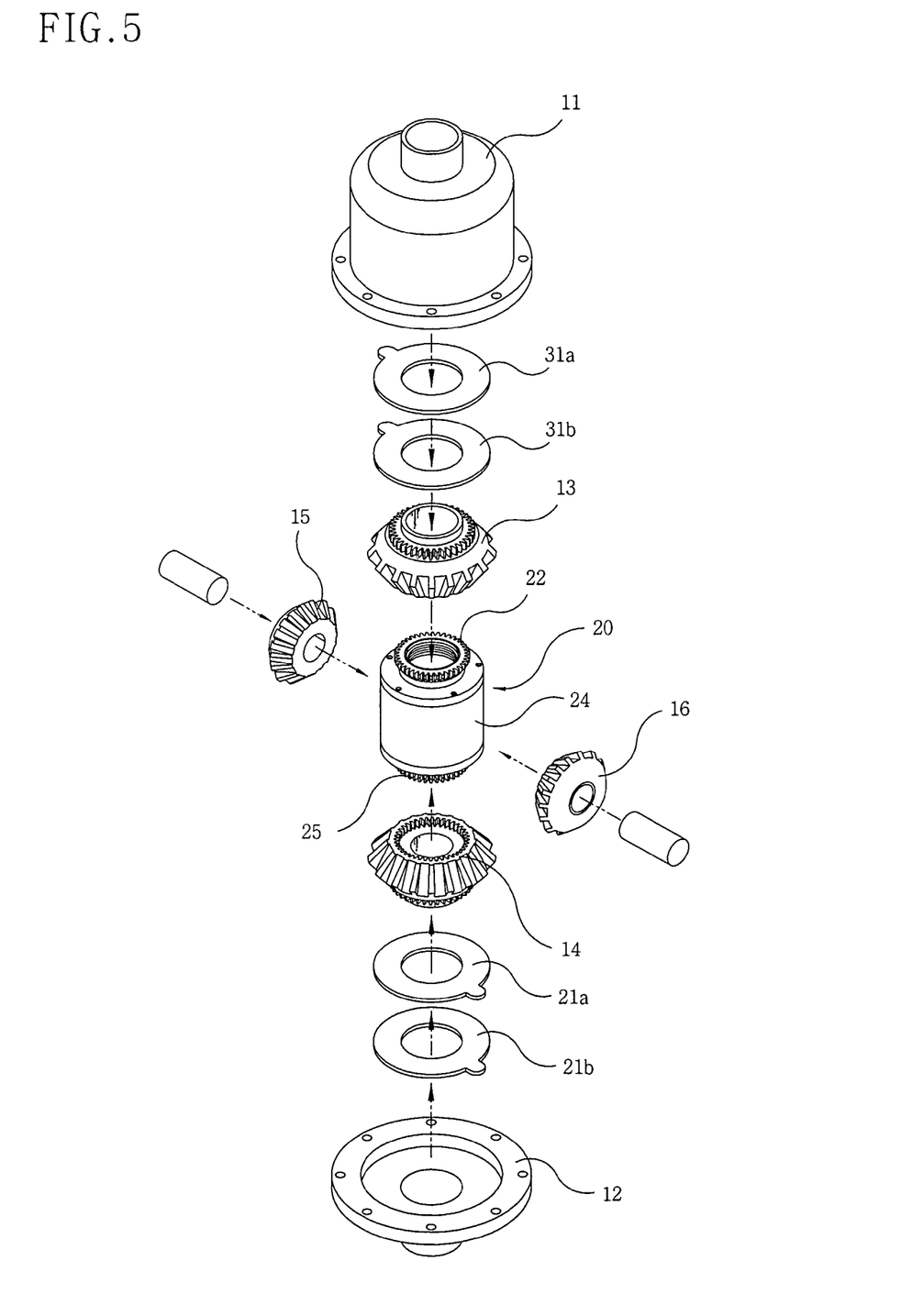
FIG. 5 is a drawing showing the separated state of the frictional limited slip differential using the pressure generating device of the present invention.
Figure 6:
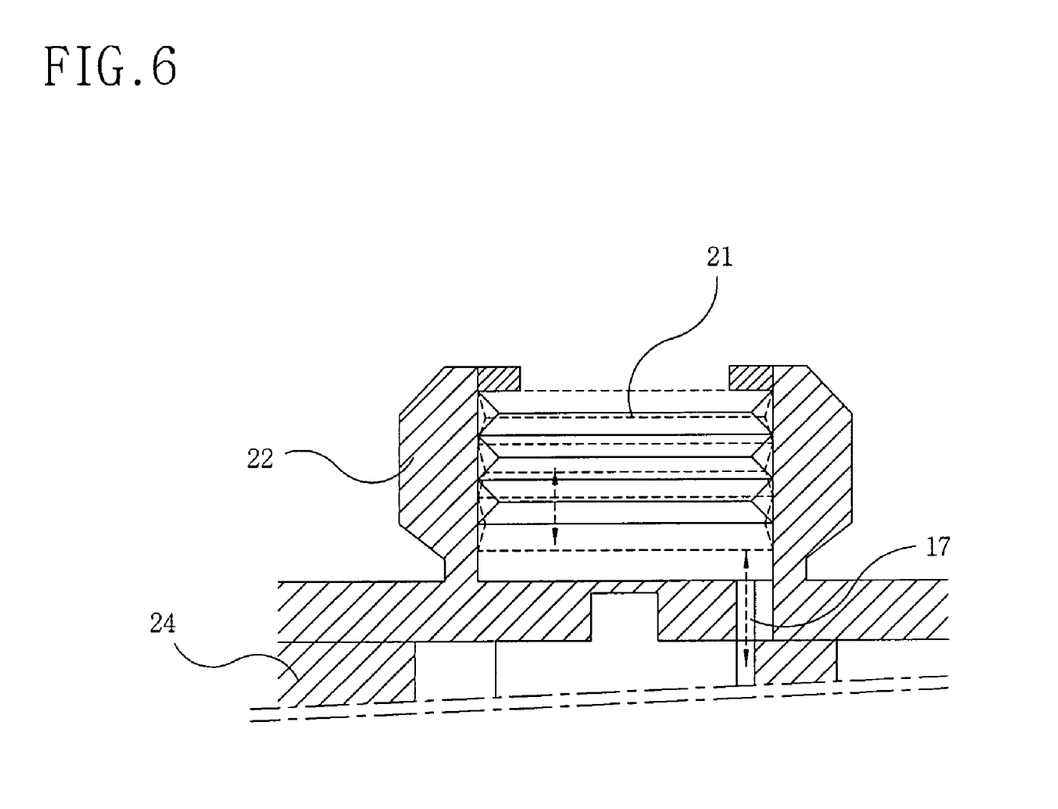
FIG. 6 is a drawing showing the state of the bellow (21) of the frictional limited slip differential using the pressure generating device of the present invention.
Figure 7:
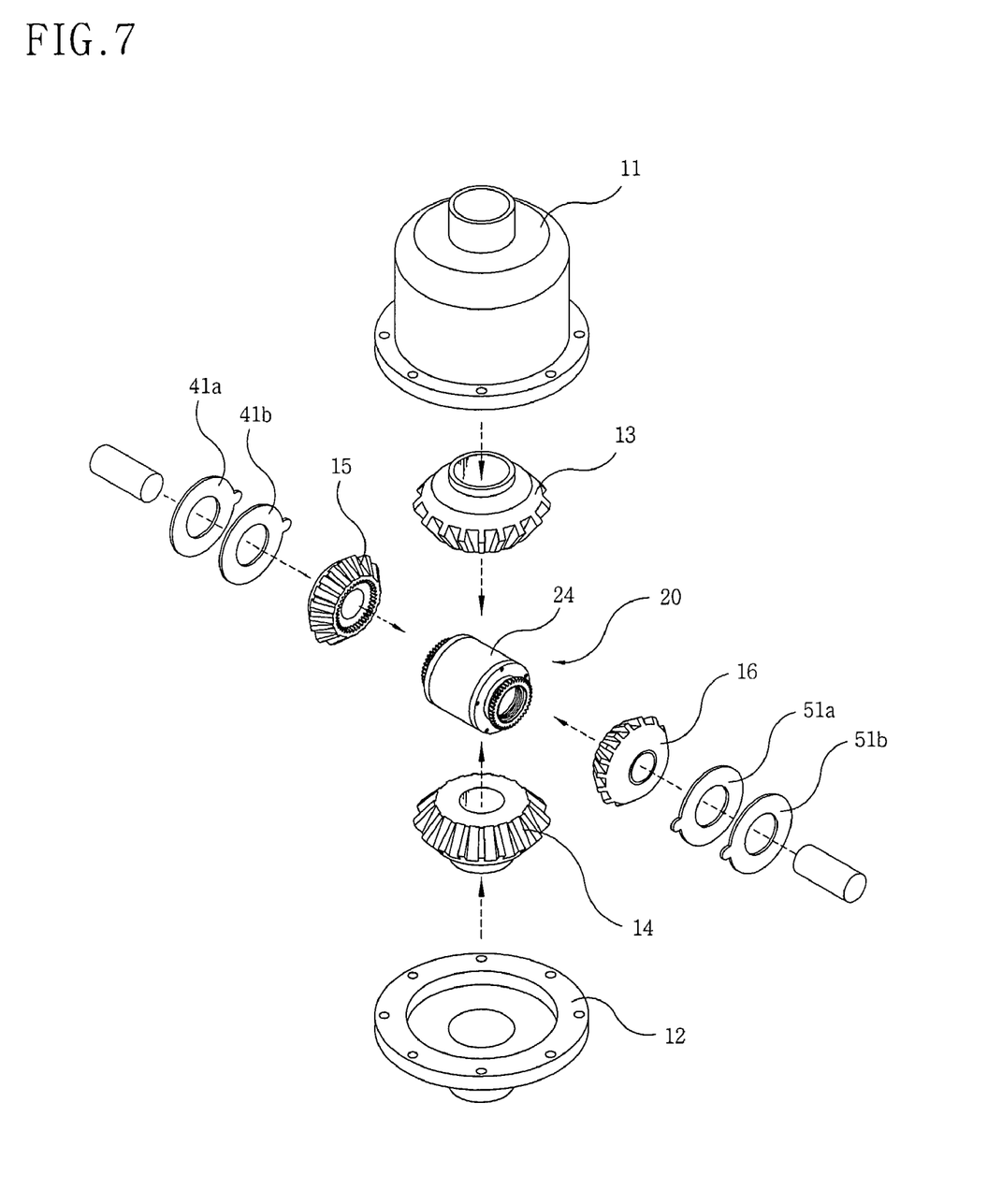
FIG. 7 is a drawing showing another example of the frictional limited slip differential using the pressure generating device of the present invention.
Figure 8:
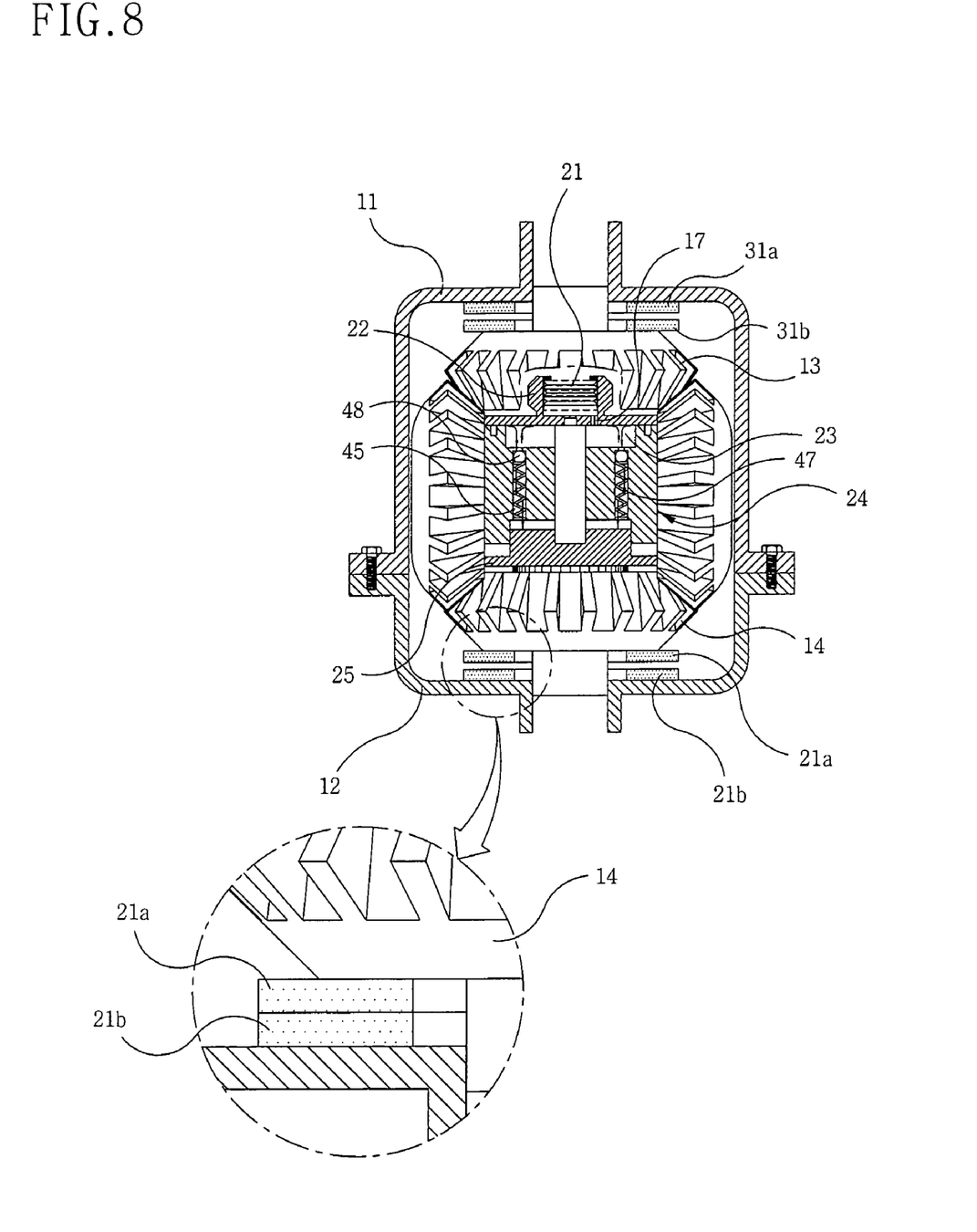
FIG. 8 is a drawing showing the cross-section of the frictional limited slip differential using the pressure generating device of the present invention.

FIG. 3 is a drawing showing the separated state of the pressure generating device of the limited slip differential of the present invention, and FIG. 4 is a drawing showing the assembled state of the pressure generating device of the limited slip differential of the present invention, and FIG. 5 is a drawing showing the separated state of the frictional limited slip differential using the pressure generating device of the present invention, and FIG. 6 is a drawing showing the state of the bellow (21) of the frictional limited slip differential using the pressure generating device of the present invention, and FIG. 7 is a drawing showing another example of the frictional limited slip differential using the pressure generating device of the present invention, and FIG. 8 is a drawing showing the cross-section of the frictional limited slip differential using the pressure generating device of the present invention.

The frictional limited slip differential using the pressure generating device according to the present invention, as illustrated in FIG. 3, has a body cylinder (24) having discharging channels located at the center of the inside thereof.

A trocoid gear pump (23) is formed inside diameter of the body cylinder (24), and the trocoid gear pump (23) is engaged with the lower part piston gear (25) for rotating in the opposite direction.

A cover gear (22) is mounted at the upper side of the body cylinder in a unit to rotate identically in order not to discharge pressure at the upper side when the gear pump (23) operates.

Accordingly, the present invention is constituted with the cover gear (22) and the lower side piston gear (25) formed as above to rotate opposite to each other when the slip differential of the vehicle occurs while rotating the trocoid gear pump (23) in the inside thereof.

If the trocoid gear pump (23) rotates as above, oil charged at the inside is compressed by the rotation of the trocoid gear pump (23), and the oil is pushed through the discharging channels (45) of the trocoid gear pump (23).

If the pressure is generated inside the trocoid gear pump (23) and the oil is discharged through the discharging channels (45), the discharged oil is operated to push the piston gear (25) located at the lower side of the body cylinder (24).

If the cover gear (22), the body cylinder (24) and the lower side of the piston gear (25), etc. are assembled according to the constitution of the present invention, as illustrated in FIG. 4, a small cylindrical type is formed.

The pressure generating device (20) comprised of the cover gear (22), the body cylinder (24) and the piston gear (25) to be closed with its inside in a state filled with the oil is mounted to be coupled/engaged with the gears rotating at the inside thereof in a state covered with the body section (12) and the fixed cover (11). The pressure generating device (20) is formed to be coupled/engaged with a first side pinion gear (14) arranged to be connected to the driving shaft of the vehicle inside the body section (12) and a second side pinion gear (13) rotatably connected to the driving shaft of the vehicle positioned opposite to the first side pinion gear (14).

A pair of differential pinion gears (15, 16) each of which is rotated in engagement with the first side pinion gear (14) and second side pinion gear (13) is mounted thereon.

Also, the present invention operates a pressure generating device (20) by providing friction plates (21a)(21b)(31a)(31b) at the rear sides of the first side pinion gear (14) and second side pinion gear (13) so as to have friction therebetween for restricting the slip differential.

The pressure generating device (20) extends to the both ends by the oil pressure, generates a slip action to the first side pinion gear (14) and the second side pinion gear (13), and restricts the slip differential by increasing the friction force on the friction plates.

The present invention combines the pressure generating device (20) inside of the limited slip differential constituted as above to be coupled/engaged with the first side pinion gear (14) and the second side pinion gear (13).

The cover gear (22) of the pressure generating device (20) is combined to be coupled/engaged with the second side pinion gear (13), and the piston gear (25) of the pressure generating device (20) is combined to be rotably coupled/engaged with the first side pinion gear (14).

Examining the operating state of the limited slip differential constituted as above, as illustrated in FIG. 8, if only the wheel coupled to any one of the first side pinion gear (14) or the second side opinion gear (13) falls in the mire, etc. and rotates, the cover gear (22) and the piston gear (25) combined to be coupled/engaged with the first side pinion gear (14) and the second side pinion gear (13) rotate opposite to each other, and the pressure is generated.

At this time, the piston gear (25) of the pressure generating device (20) rotates the trocoid gear pump (23), and applies pressure to the oil filled inside thereof to operate to push the oil outwardly.

If the trocoid gear pump (23) rotates as above, the oil inside thereof is formed on the discharging channels (45), and pushes a shielding ball (48) of the one-directional choke valve, wherein the oil is moved to the lower side of the piston gear (25) side.

The shielding ball (48) of the one-directional choke valve on the discharging channels (45) is fitted with a pushing spring (47) in order to always close the inlet of the discharging channels (45) when the piston gear (25) and the cover gear (22) are not rotating.

With regard to the shielding ball (48) of the one-directional choke valve formed as above, if the pressure of the oil is generated from the trocoid gear pump (23), the pressure of the oil pushes and discharges the shielding ball (48) of the one-directional choke valve.

Also, if the trocoid gear pump (23) in operation stops, the pressure inside thereof is reduced, and the pressure of the oil which was discharged is slowly saturated between the surface of the inlet facing the shielding ball (48) of the one-directional choke valve reversely along the discharging channels (45), and the oil is reversely introduced into the inside of the stopped trocoid gear pump (23). Although the shielding ball (48) of the one-directional choke valve is always pushed by the pushing spring (47), as the outward oil is slowly saturated between the gap against which the shielding ball (48) faces and contacts, it is characterized in that the inside of the trocoid gear pump (23) is automatically introduced with the oil and the original oil pressure is maintained in order to be operated again.

If the pressure of the oil is generated within the pressure generating device (20) according to the above operation, the oil pressure filled in the inside thereof pushes the piston gear (25) and simultaneously pressurizes the cover gear (22) to the both ends in order to simultaneously push the first side pinion gear (14) and the second side pinion gear (13).

As the inside of the pressure generating device (20) of the present invention is provided with the trocoid gear pump (23), and simultaneously charged/filled with the viscous fluid, if the slip differential of the vehicle is generated, any one of the first or the second side pinion gear (14)(13) is rotated and accordingly, the cover gear (22) of the upper portion and the piston gear (25) of the lower portion which are engaged to each other rotate opposite to each other and rotate the trocoid gear.

That is, if the pressure is generated due to the rotation of the trocoid gear, the filled viscous fluid is moved from the body cylinder (24) to the lower portion of the piston gear (25) through the two discharging channels (45) of the one-directional choke valve, and as the lower portion of the piston gear (25) is pushed to the end side due to the pressure of the oil moved through the discharging channels (45), the side pinion gear is slipped and pushed.

At this time, as the oil pressure within the body cylinder (24) becomes lower than the pressure of the oil stored within the upper portion of the cover gear (22), the extra oil filled in the space of the inside of the upper portion of the cover gear (22) is flown along the discharging channels (45) to the inside of the body cylinder (24), whereby it is characterized in that the oil that departed is supplemented so as to generate much more clearance/off set/recess of the piston.

As illustrated in FIG. 6, the oil inside of the upper portion of the cover gear (22) is shielded/closed by the flexible bellow (21), and thus at the supply and recovery of the oil, the oil moves freely up and down so as to maintain the pressure within the space.

The inside of the bellow (21) formed on the upper portion of the cover gear (22) is filled with the oil, and a flow channel (17) is formed in order to transfer the oil filled in the bellow (21) to the side of the body cylinder (24).

If the first allowance/margin/excess of the oil of the bellow (21) is supplied to the body cylinder (24), the bellow (21) in the amount as much as the supplied oil falls down therealong and is moved. Such is owing to the fact that the inside of the upper portion of the cover gear (22) is at the atmospheric pressure, and thus the existing oil due to the pressure generation of the trocoid gear pump (23) departs to the discharging channel and simultaneously, the inside of the body cylinder (24) becomes a state of vacuum.

Accordingly, the pressure difference occurs at this time, and the oil inside of the upper portion of the cover gear (22) is moved to the cylinder.

Also, in order to maintain the atmospheric pressure inside of the upper portion of the cover gear (22) as it is, the bellow (21) as thin as the space of the oil departed from the inside of the upper portion of the cover gear (22) is moved, whereby it is characterized in that the state of atmospheric pressure which is not the state of vacuum is maintained as it is.

As the bellow (21) closes up to the original state contrary to the above at the time of recovery, a space is developed in order for the recovering oil to be filled therein.

Likewise, if the first side pinion gear (14) and the second side pinion gear (13) are pressurized and pushed out, the bellows (21a)(21b)(31a)(31b) located at the rear are pressurized to each other to have friction therebetween. Thus, at both sides, the first side pinion gear (14) and the second side pinion gear (13) do not rotate in the opposite direction, but are rotated in the same direction.

If the rotation direction of the first side pinion gear (14) and the second side pinion gear (13) is rotated in the same direction, the wheel vainly rotating as it fell in the mire and the wheel of the opposite side which does not rotate are rotated identically in the same direction, whereby it is characterized in that the wheel gets out of the mire.

As illustrated in FIG. 7, as another example of the present invention, it is also possible not to form a bellow on the first side pinion gear (14) and the second side pinion gear (13), but to form a bellow at the rear side of the slip differential gears (15)(16) which rotate as above.

Further, the pressure generating device (20) of the present invention is located between the slip differential gears (15) (16), and in order to be rotably coupled/engaged with the slip differential gears (15)(16), the cover gear (22) and the piston gear (25) are combined.

With regard to the pressure generating device (20) combined as above, if the wheel of the one side of any one of the first side pinion gear (14) or the second side pinion gear (13) falls in the mire, only the wheel fell in the mire rotates.

At this time, at the inside thereof, the differential gears (15)(16) identically rotate to which the first side pinion gear (14) and the second side pinion gear (13) are identically engaged.

If the differential gears (15)(16) rotate as above, the cover gear (22) and the piston gear (25) of the pressure generating device (20) mounted therebetween also rotate identically.

If the cover gear (22) and the piston gear (25) rotate, the trocoid gear pump (23) formed inside thereof also rotates identically and performs the pumping function. Thus, the oil filled inside thereof is discharged to the discharging channels (45) of the body cylinder (24).

If the oil filled inside thereof is discharged to discharging channels (45) as above, the piston gear (25) is pushed to the side of the one end due to the pressure of the discharged oil, and simultaneously the body cylinder (24) having the cover gear (22) is pushed to the opposite side of the one end.

It is pushed to the side of the cover gear (22) and the piston gear (25) due to the pressure of the oil discharged to the discharging channels (45) of the body cylinder (24), and simultaneously the differential gears (15)(16) are pushed to both of the outsides thereof, and simultaneously the bellows (21a)(21b)(31a)(31b) formed at the rear side of the differential gears (15)(16) are pushed to each other and have friction therebetween.

Accordingly, if the bellows (21a)(21b)(31a)(31b) are engaged to each other and have much friction, the differential gears (15)(16) do not rotate in the opposite direction to each other, but slip to both sides of the ends, and are pushed and tightened. Thus, it is characterized in that both of the first side pinion gear (14) and the second side pinion gear (13) do not rotate in the opposite direction to each other, but rotate in the same direction.

Further, the bellows formed in the present invention use two bellows by overlapping them, but it is also possible that one bellow can be additionally inserted therebetween as well as overlapping at least two bellows therebetween.

Other than the above method, it is characterized in that the pressure generating device of the present invention is at the right angle with the direction engaged with the piston gear, and the pressure generating device can be freely detachable to the side pinion gears and the differential pinion gears.

If the pressure generating device of the present invention is mounted between the side pinion gears, the bellows are provided at the rear side of the differential pinion gears for the piston gear attached at the side thereof to push the differential pinion gear, and if it is mounted between the differential pinion gears, the bellows are provided at the rear side of the side pinion gears for the piston gear to operate to push the side pinion gears, whereby it is characterized in that the slip differential can be restricted accordingly.

INDUSTRIAL APPLICABILITY

Accordingly, owing to the frictional limited slip differential using the pressure generating device of the present invention, it is characterized that not only does the present invention smoothly operate when turning corners as it has the differential function applied conventionally, but also if friction on both wheels is different due to mud, sand pit or iced ground and thus when a situation comes for only one wheel which does not have any friction to be unable to move rotates, it is characterized in that the function limiting slip differential is activated, the wheel with much more friction is moved, and thus the body of vehicle can be moved.

Also, since the slip differential and the limited slip differential are in a single unit, without installation of the additional parts such as other limited slip differential or without change of design in the body of the vehicle, it only needs to exchange the conventional slip differential with the slip differential having the limited differential function of the present invention. Thus, the installation cost is cheap and without change to the design, it is possible to mount on the conventional vehicle.

Moreover, as it is possible to reduce the size to the minimum compared to the conventional limited slip differential, advantages are provided wherein the volume and weight can be remarkably reduced reducing the weight of the vehicle body and increasing the continued ratio.

What is claimed is:

1. A frictional limited slip differential comprising:
   a body section having a fixed cover,
   a first side pinion gear arranged inside of said body section and connected with a driving shaft of a vehicle,
   a second side pinion gear rotatably connected with a driving shaft of said vehicle opposite to said first side pinion gear,
   a pair of differential pinion gears each of which is rotated in engagement with said first side pinion gear and second side pinion gear,
   friction plates arranged at rear sides of said first side pinion gear and second side pinion gear, and
   a pressure generating device being filled with viscous fluid and having a cover gear and a piston gear, and being constructed such that said cover gear and said piston gear engage with said second side pinion gear and first side pinion gear, respectively, and can be displaced away from each other in a longitudinal direction of said device by a pressure of the viscous fluid pushing said second side pinion gear and said first side pinion gear, respectively.

2. A frictional limited slip differential comprising:
   a body section having a fixed cover,
   a first side pinion gear arranged inside of said body section and connected with a driving shaft of a vehicle,
   a second side pinion gear rotatably connected with a driving shaft of a said vehicle opposite to said first side pinion gear,
   a pair of differential pinion gears each of which is rotated in engagement with said first side pinion gear and second side pinion gear,
   friction plates arranged at rear sides of said differential pinion gears, and
   a pressure generating device being filled with viscous fluid and having a cover gear and a piston gear, and being constructed such that said cover gear and said piston gear engage with said differential pinion gears, respectively, and can be displaced away from each other in a longitudinal direction of said device by a pressure of the viscous fluid pushing said second side pinion gear and said first side pinion gear, respectively.

3. A frictional limited slip differential according to claim 1 or 2, wherein said pressure generating device comprising:
   a body cylinder secured to and rotated together with the cover gear as a unit, and at lower part thereof incorporating piston gear which can be rotated in a direction opposite to said cover gear,
   a trocoid gear pump arranged inside of said body cylinder and generating pressure while rotating along with said piston gear, and
   discharging channels delivering said pressure generated by the rotation of said trocoid gear pump to said piston gear.

4. A frictional limited slip differential according to claim 3, wherein a flow passage is formed in said cover gear leading to the inside of said body cylinder, and a bellow is formed inside said cover, and wherein said bellow is filled with oil and an amount of oil in said bellow is adjusted through said flow passage when pressure is generated in said body cylinder.

* * * * *